United States Patent [19]
Wright

[11] 3,927,707
[45] Dec. 23, 1975

[54] CLIP NUT

[75] Inventor: Thomas B. Wright, Diamond Bar, Calif.

[73] Assignee: TRW Inc., Cleveland, Ohio

[22] Filed: Oct. 11, 1973

[21] Appl. No.: 405,321

[52] U.S. Cl. .............................. 151/41.75; 52/758 F
[51] Int. Cl.$^2$ ......................................... F16B 37/04
[58] Field of Search ......... 151/41.75; 248/488, 490, 248/40, 222; 52/758 F

[56] References Cited
UNITED STATES PATENTS

| 2,258,845 | 10/1941 | Burke | 151/41.75 |
|---|---|---|---|
| 2,382,942 | 8/1945 | Murphy | 151/41.75 |
| 2,558,720 | 7/1951 | Hansman | 151/41.75 |
| 2,861,618 | 11/1958 | Tinnerman | 151/41.75 |
| 2,891,756 | 6/1959 | Packard | 248/222 |
| 3,009,275 | 11/1961 | Rosenberg | 248/490 |
| 3,217,773 | 11/1965 | Munse | 151/41.75 |
| 3,669,170 | 6/1972 | Schuster | 151/41.75 |
| 3,692,266 | 9/1972 | Jacobs | 248/490 |

FOREIGN PATENTS OR APPLICATIONS

| 802,435 | 10/1958 | United Kingdom | 151/41.75 |
|---|---|---|---|

Primary Examiner—Marion Parsons, Jr.
Attorney, Agent, or Firm—Lawrence S. Cohen, Esq.

[57] ABSTRACT

A clip nut for use at a corner of a plate or work panel where a hole is near the corner. The clip nut has a threaded nut element and two bent arms extending at an angle to receive and grip the work panel around its converging edges. The arms have a back portion which serves to mate with the converging edges of the panel that meet at the corner and thereby to locate the nut element with respect to the hole. Dimples on the arms cause resilient stress on the arms when assembled to a panel to hold the clip nut in place.

15 Claims, 6 Drawing Figures

U.S. Patent   Dec. 23, 1975   3,927,707
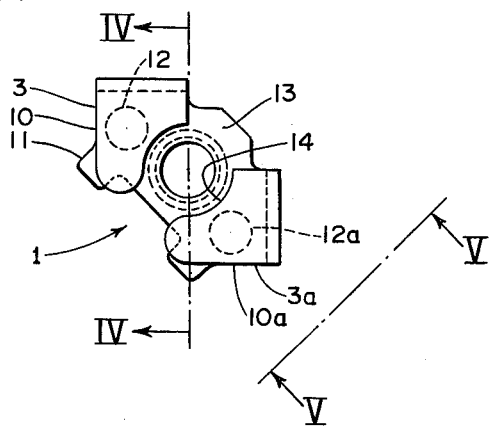
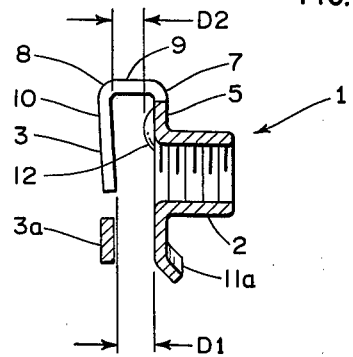
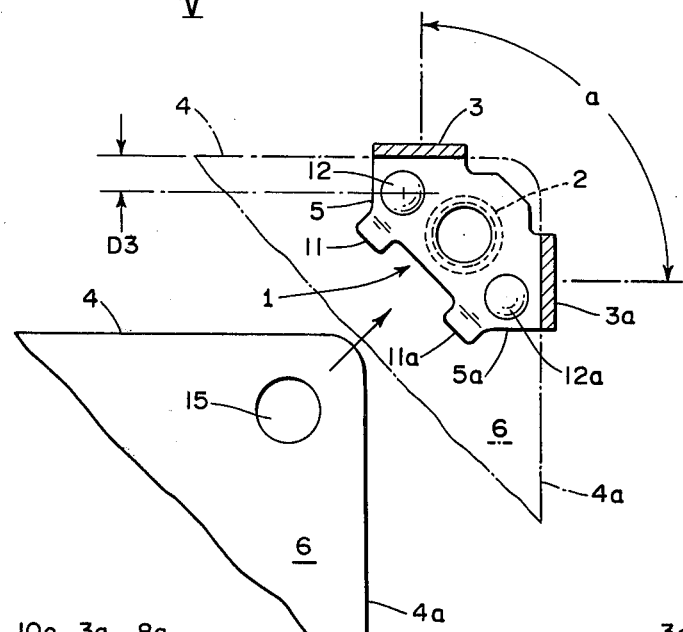
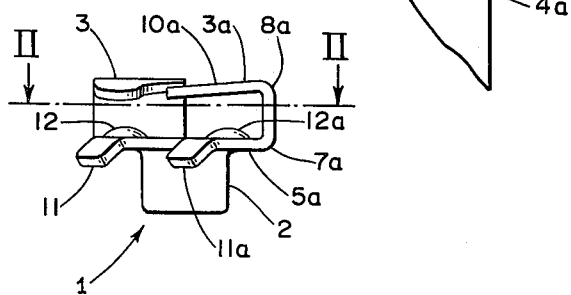
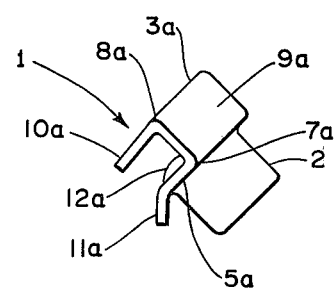
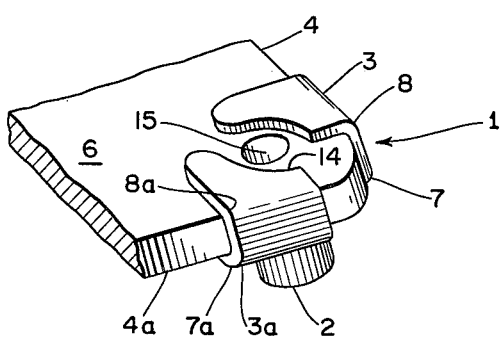

CLIP NUT

BACKGROUND OF THE INVENTION

This invention relates generally to fastening devices of the clip nut type which are adapted to be applied to and retained on the edge of an apertured work panel to provide a threaded retention device; that is, a nut, to receive a threaded fastener such as a screw.

In particular, this invention is a type of clip nut for use on a corner of a work panel and which is self-locating to put the nut element in line with the hole in the work panel and also to permit rapid, easy assembly and secure retention on a work panel.

The term clip nut will be used in this disclosure to refer to the present invention as well as the entire general field. Other terms in use are "C-type fastener"; "U-shaped clip-nut"; "J-fasteners" and the like which describe the general shapes. Clip nuts are usually made of spring steel or hardenable steel formed from thin sheets by punching and bending and usually followed by heat treatment. An earlier form of clip nut is described in U.S. Pat. No. 2,062,685 to G. A. Tinnerman. In recent years, the field has specialized to include wide range clip nuts capable of emplacement on a wide range of panel thicknesses, such as shown in U.S. Pat. No. 3,358,729 to R. A. Munse.

Clip nuts usually slide onto the edge of a work panel with a portion on each side of the panel to place a nut element in line with a hole. Sometimes a clip nut is attached through a slot in a work panel rather than at an edge.

They are used in any application where access is limited so that manually holding a nut behind the hole is difficult or impossible. They are also used where it is desired to provide self-retention of the nut on the work panel without riveting or other expensive means. Common uses are in automobile or aircraft assembly, particularly on instrument panels. In such cases, a connector or instrument is provided with a flange with holes which constitutes the work panel. The clip nut is put in place and thereafter the part is screwed onto the receiving member.

Most clip nuts are located in line with a hole by eye or by a piece that extends into the hole such as in U.S. Pat. No. 3,414,035 to R. A. Munse. Rapid emplacement and accurate locating on a work panel are important features of any clip nut. Low cost is another important feature.

The clip nut described herein provides the features of low cost; ease of assembly; self-location on a corner; and reliable retention on a work panel. In a typical application, it is located at the four corners of a flange of a circular connector to be mounted on an aircraft instrument panel. In such applications, considerable precision and reliability are required which are provided by this clip nut.

In many applications, a hole size is specified in a work panel appropriate for a given screw. In such cases, a locating means is required which does not set into the screw hole. This invention provides such a locating means and thus does not require a hole size other than one necessary for clearance of the screw alone.

SUMMARY OF THE INVENTION

The clip nut of the present invention comprises a threaded nut element which has attached to it two arms extending in a plane which is radial to the longitudinal axis of the nut element at pre-determined angles. The arms are bent back upon themselves to form upper and lower opposed portions, the space between them adapted to receive a work panel. In a further embodiment protrusions extend into the space from the lower portion of the arm. In a further embodiment, the upper arm portions converge slightly toward the lower arm portions rather than being parallel. In another embodiment, bent guide tabs extend generally away from the arms to facilitate emplacing the clip nut on a work panel.

BRIEF DESCRIPTION OF THE DRAWINGS

FIG. 1 is a top view of the preferred embodiment of the clip nut.

FIG. 2 is a sectional top view of the preferred embodiment of the clip nut taken through line II—II of FIG. 3 with a work panel shown in a preparatory position and in an emplaced position. FIG. 3 is a side view of the preferred embodiment of the clip nut.

FIG. 4 is a sectional side view of the preferred embodiment of the clip nut taken through line IV—IV of FIG. 1.

FIG. 5 is a side view of the preferred embodiment of the clip nut.

FIG. 6 is a perspective view of the clip nut on a work panel.

DESCRIPTION OF THE PREFERRED EMBODIMENT

The clip nut of the invention, like most clip nuts, may be formed from sheet metal by forming, punching, drawing or like process and combinations thereof. It is then typically heat treated to impart hardness and spring characteristics to it.

As illustrated in the drawings, the clip nut 1 has a threaded nut element 2 and extending radially from one end of the nut element 2 are a pair of arms 3, 3a.

The arms 3, 3a extend divergently at a predetermined angle a to each other which is preferably the angle supplementary to the angle between the edges 4, 4a of a work panel 6 shown in FIG. 2 in phantom, upon which the clip nut is to be used. In the illustration, a 90° angle is shown for the work panel corner and therefore, the angle a is also 90°.

Clip nuts may be constructed with other angles. However, since it is preferred that the arms wrap squarely around the edges of the work panel, that is at a 90° angle, the arms should be at an angle supplementary to the angle between the converging edges; that is, the angles should add up to 180°.

The arms 3, 3a have lower portions 5, 5a respectively, which are integral with the nut element 2. They extend as mentioned radially; that is, in a plane normal to the longitudinal axis of the nut element. Each of the arms 3, 3a has a first bend 7, 7a, respectively, which is transverse to the center line of the arms 3, 3a. The arms 3, 3a have a second bend 8, 8a; also transverse to the arms 3, 3a and parallel to the first bend which establishes on each arm an upstanding portion 9, 9a and an upper portion 10, 10a. Thus the bend 8, 8a extend the length of the upstanding portions 9, 9a.

The distance between the upper portions 10, 10a and the lower portions 5, 5a is preselected to accommodate a work panel 6. As thus far described, that distance must be slightly more than the thickness of the work panel 6 with which the clip nut is to be used. The upper and lower arms may converge somewhat in order that the spring characteristics of the arms will firmly grip the work panel until a screw or like threaded member is inserted. This embodiment is explained in greater detail below.

The clip nut 1 is emplaced on a work panel 6, as suggested by the arrow in FIG. 2, by moving them together at the corner of the work piece. By the above described configuration, the clip nut 1 will precisely self-locate at the corner due to the mating contact of the converging edges 4, 4a with the upstanding portions 9, 9a. The threaded nut element 2 will properly align with the hole 15 in the work panel 6.

An additional feature are the tabs 11, 11a which extend, like the lower portions 5, 5a of the arms in a radial plane from the nut element 2, but are also bent away from the upper portions 10, 10a.

The tabs 11, 11a serve to guide the clip nut 1 as it is emplaced on the work panel 6, so that the clip nut 1 may approach the work panel 6 at a slight angle and upon contact of the tabs 11, 11a, will slide accurately onto the work panel 6.

An important advantage of the invention is provided by the protrusions 12, 12a which rise off the lower portions 5, 5a into the space between the lower portions 5, 5a and the upper portions 10, 10a.

The shape of the protrusions may vary somewhat, a generally dome shape being shown and preferable. This shape aids in setting the clip nut on the work panel before it is pushed "home". The protrusions 12, 12a are high enough that the space left between them and the upper portions 10, 10a is slightly less than the thickness of a work panel 6, while the remainder of the space may be slightly greater than the thickness of a work panel 6. Therefore, in the course of emplacing a clip nut so constructed, the clip nut is initially freely fitted to the corner of a work panel because the space between the upper and lower arms is wider than the thickness of the work panel. Then when the protrusions 12, 12a begin to slide along the work panel, the upper arms of the clip nut are slightly spread and place a resilient gripping force on the work panel. The resilient qualities of the metal used provide sufficient gripping action to hold the clip nut in place.

In a further important embodiment, it has been found that when the upper portions 10, 10a are bent slightly to converge toward the lower portions 5, 5a then in combination with the protrusions 12, 12a; the distance D1 between the ends of the upper portions 10, 10a and the lower portions 5, 5a and the distance D2 between the protrusions 12, 12a and the upper portions 10, 10a may be slightly greater than the thickness of a work panel on which it is to be emplaced. Under these conditions, resilient stress is placed upon the arms 3, 3a and a tight fit of the clip nut 1 on the work panel 6 is achieved.

This is important for the following exemplary reason. The work panels with which the clip nut is frequently used are the flanges of coaxial connectors. In one exemplary case, the flange tolerances permit a thickness from 0.058 inch to 0.069 inch. With the protrusions and the slight convergence of the upper arm portions as above described, it is possible to accommodate the 0.011 inch range of thickness dictated. In this case, the dimension D1 may be 0.065 – 0.062 inch and the dimension D2 may be 0.062 – 0.060 inch. Thus, if a a flange is only 0.058 inch thick, it will still be tightly gripped although both dimensions D1 and D2 are larger.

In a further closely related embodiment, a flange 13 extends from and around the end of the nut element in a radial plane and the arms 3, 3a extend from the flange. In this sense, the flange 13 and the arms 3, 3a, that is the lower portion 5, 5a of the arms are integral and coplanar and, in fact, merge. The entire flange 13 contributes to gripping a work panel although when the protrusions 12, 12a are employed some part of the flange 13 will be lifted off the work panel 6. It is the intention when describing the arms in this description to permissably include the flange 13 as a part thereof.

Notably, the protrusions 12, 12a are shown as being near to the point of entry of a work panel 6 relative to the upstanding portion 9, 9a. It is advantageous to have the distance D3 as shown in FIG. 2 as large as possible in order to provide the greatest gripping effect and ease of installation. In general, it has been found that with a greater distance from the bend, either 7, 7a or 8, 8a to the pressure point of the respective arms on the panel, there is an increasing effectiveness of the grip and an increasing ease of installation.

In order to not cover the threaded portion of the nut element 2 a curved notch 14 is taken from each of the upper arm portions 10, 10a.

As a typical example when desired to be used with a work panel of from 0.058 inch to 0.069 inch, the space between the upper and lower portions of the arms may be nominally 0.072 inch at the upstanding portion 9, 9a and the protrusions may be nominally about 0.010 inch.

The upstanding portion 9, 9a is preferably substantially flat with small radii at the bends 7, 7a and 8, 8a in order to provide precise and firm mating and locating on the work panel 6. If larger radii are used or even a single curved bight, then the precision of locating will be decreased.

This clip nut is adopted to accommodate various sizes and shapes of work panels. Numerous changes in details of construction may be effected without departing from the spirit of the invention as defined in the following claims.

I claim:

1. A clip nut for attachment to a work panel in which converging edges define a corner with an aperture in the panel near the corner comprising:

a threaded nut element a pair of lower arm portions integral with the nut element and extending in a plane normal to the longitudinal axis of the nut element at one end thereof, the arms extending divergently at a predetermined angle to each other;

a pair of upper arm portions spaced from the lower arm portions and extending substantially over the lower arm portions;

an upstanding portion integral with and connecting the respective upper and lower arm portions;

the upstanding portions comprising respectively means for contacting convergent edges of a work panel defining a corner therein and having an aperture at the corner alignable with the threaded nut element, whereby when the clip nut is fitted to such a work panel corner by contact of the upstanding portions substantially throughout their length with the convergent edges, the aperture will be aligned with the element.

2. The clip nut of claim 1 further comprising a protrusion means extending from each lower arm portion into the space defined by the lower arm portion and the upper arm portion for resting on the surface of a work panel.

3. The clip nut of claim 2 wherein the upper arm portions extend slightly convergent toward the lower arm portions.

4. The clip nut of claim 1 the upstanding portion comprising means for contacting convergent edges of a work panel is further defined by a first bend between the lower arm portion and the upstanding portion and by a second bend between the upstanding portion and the upper arm portion.

5. The clip nut of claim 4 wherein the bends in each arm extend in a direction parallel to the converging edges, respectively, of a work panel on which the clip nut is adopted to be placed.

6. The clip nut of claim 5 wherein the lower arm portions extend at an angle to each other which is supplementary to the angle of convergence of the edges of a work panel on which the clip nut is adapted to be used.

7. The clip nut of claim 5 wherein the predetermined angle between the arms is 90° and the first and second bends are at a right angle to the arms for fitting on a work panel having converging edges defining a 90° corner.

8. The clip nut of claim 5 wherein the bends are normal to the longitudinal axis of the respective arms.

9. The clip nut of claim 1 wherein the upper arm portions extend slightly convergent toward the lower arm portions.

10. A clip nut assembly comprising:
   a work panel having converging edges defining a corner and an aperture near the corner;
   a clip nut fitted to the work panel at its corner comprising:
   a threaded nut element
   a pair of arms having lower arm portions integral with the nut element and extending in a plane normal to the longitudinal axis of the nut element at one end thereof and upper arm portions spaced from the lower arm portions are extending substantially over the lower arm portions, the arms extending divergently at a predetermined angle to each other;
   upstanding portions extending from the ends of the lower arm portions in planes parallel respectively to the converging edges of the work piece and upper arm portions extending from the upstanding portions substantially over the lower arm portions;
   the nut element being aligned with the aperture in the work panel; and
   the upstanding portions are in contact with respective converging edges of the work panel serving to locate the clip nut; and the clip nut gripping the work panel in the space between the upper and lower arm portions.

11. The assembly of claim 10 wherein the predetermined angle between the arms of the clip nut is supplementary to the angle between the converging edges of the work panel.

12. The assembly of claim 11 wherein the predetermined angle between the arms of the clip nut is 90°.

13. The assembly of claim 10 further comprising a protrusion extending from each lower arm portion into the space defined by the lower arm portion and the upper arm portion.

14. The assembly of claim 13 wherein the upper arm portions extend slightly convergent toward the lower arm portions.

15. The clip nut of claim 13 further comprising tab means extending from the lower arm portions and away from the upper arm portions for guiding the clip nut onto the work panel.

* * * * *